US008389087B2

(12) United States Patent
Sendker et al.

(10) Patent No.: US 8,389,087 B2
(45) Date of Patent: Mar. 5, 2013

(54) BARRIER LAYER ARRANGEMENT FOR TANK SYSTEMS

(75) Inventors: Nikolai Sendker, Rostock (DE); Sebastian Holtz, Rostock (DE)

(73) Assignee: KAEFER Schiffsausbau GmbH, Bremen (DE)

( * ) Notice: Subject to any disclaimer, the term of this patent is extended or adjusted under 35 U.S.C. 154(b) by 0 days.

(21) Appl. No.: 13/143,255

(22) PCT Filed: Jan. 6, 2010

(86) PCT No.: PCT/EP2010/000180

§ 371 (c)(1), (2), (4) Date: Sep. 23, 2011

(87) PCT Pub. No.: WO2010/079147

PCT Pub. Date: Jul. 15, 2010

(65) Prior Publication Data

US 2012/0043335 A1 Feb. 23, 2012

(30) Foreign Application Priority Data

Jan. 6, 2009 (DE) ......................... 10 2009 004 066

(51) Int. Cl.
*B32B 23/00* (2006.01)

(52) U.S. Cl. .............. 428/36.4; 220/560.04; 220/560.06

(58) Field of Classification Search ................. 428/36.4, 428/36.91; 220/560.04, 560.06, 560.08
See application file for complete search history.

(56) References Cited

U.S. PATENT DOCUMENTS 3,993,123 A * 11/1976 Chu et al. ..................... 165/80.3
5,292,027 A 3/1994 Lueke
5,462,791 A 10/1995 Kashima et al.
6,145,692 A 11/2000 Cherevatsky
7,541,078 B1 * 6/2009 Arritt et al. ................ 428/36.91
7,867,589 B2 * 1/2011 DeLay ....................... 428/36.91
2012/0043335 A1 * 2/2012 Sendker et al. .......... 220/560.06

FOREIGN PATENT DOCUMENTS

EP 2 039 979 A1 3/2009
FR 2 717 298 A1 9/1995
WO WO 2004074737 A1 9/2004
WO WO 2008125248 A1 10/2008

* cited by examiner

*Primary Examiner* — N. Edwards
(74) *Attorney, Agent, or Firm* — McGlew and Tuttle, P.C.

(57) ABSTRACT

A barrier layer arrangement for tank systems includes at least one layer made of a material that has anisotropic properties. The anisotropic properties can be specifically adjusted by way of the design of the layer and/or the material parameters.

20 Claims, 2 Drawing Sheets

BARRIER LAYER ARRANGEMENT FOR TANK SYSTEMS

CROSS REFERENCE TO RELATED APPLICATIONS

This application is a United States National Phase application of International Application PCT/EP2010/000180 and claims the benefit of priority under 35 U.S.C. §119 of German Patent Application DE 10 2009 004 066.8 filed Jan. 6, 2009, the entire contents of which are incorporated herein by reference.

FIELD OF THE INVENTION

The invention relates to pertains to a barrier layer arrangement for tank systems and more particularly to a barrier layer arrangement with gas-tight properties for containers for transporting and storing liquefied gases.

BACKGROUND OF THE INVENTION

Various types of tank systems are available for the transportation and storage of ultra cold liquids, for example, liquefied natural gas (LNG). Non-self-supporting membrane tanks, in which the containment system is installed directly on the load-bearing structure, represent a variant that is widely used because of the large cargo volume.

Membrane tank systems are made, corresponding to applicable sets of rules, e.g., the IGC Code, of at least one gas-tight barrier layer and at least one insulating layer; two gas-tight barrier layers are required in the example of the IGC code.

Shrinkage of the barrier material occurs due to the very low temperatures of the cargo being transported, which are, for example, −160° C. and lower. Since the tank system is rigidly connected to the load-bearing structure, these shrinkages are to be compensated by compensating elements.

Membrane tank systems being used currently use metallic materials as a barrier material and compensate the shrinkages by introducing compensators in the form of beads. The use of special alloys, for example, FeNi36, whose coefficient of thermal expansion is very low, is also known for minimizing shrinkages.

Based on the isotropic material characteristics (materials geometrically uniformly expanding or contracting during temperature changes), compensating beads are necessary in a plurality of directions, which inevitably causes beads to geometrically intersect each other. This requires crossing elements of complex shapes or the interruption of a bead, which leads to stress peaks in the barrier.

A multilayer panel for lining liquefied-gas containers with an insulating plate consisting of a heat-insulating material and a seal coating, in which the seal coating has a thermal compensator designed as an endless, e.g., circular bead, is known from WO 2008/125248.

SUMMARY OF THE INVENTION

An object arises to develop a barrier layer arrangement for tank systems, which has a simplified design and makes possible an automated, continuous manufacturing process, wherein the stresses occurring due to temperature changes shall be kept low.

A barrier layer arrangement for membrane tank systems with at least one layer is provided, wherein said layer is manufactured from a material with anisotropic properties. The anisotropic properties can be set in respect to the thermal expansion characteristics and preferably also in respect to the elasticity properties such that a value of a quotient of coefficients of thermal expansion in a secondary direction and coefficients of thermal expansion in a primary direction orthogonal to the secondary direction as well as preferably a value of a quotient of a modulus of elasticity in the primary direction and a modulus of elasticity in a secondary direction are each greater than 1.3.

The quotient of the coefficients of thermal expansion is especially preferably greater than 4 or greater than 20 and the quotient of the moduli of elasticity is greater than 2.

The material is preferably a composite. Due to the anisotropy of the coefficient of thermal expansion and of the modulus of elasticity, expansions and shrinkages caused by great temperature changes can be set specifically in a direction-dependent manner, and compensators may be introduced in one direction only.

The anisotropic properties of the composite, which may be designed as a fiber composite, can be defined by a design of a plurality of layers of a fiber material with oriented fibers, which said layers are arranged at certain angles in relation to one another, wherein, for example, three layers arranged at different angles in relation to one another are provided, and the angles of the layers in relation to one another are between −45° and 45° in relation to a defined primary direction. Angles between principal fiber directions of the layers shall be called angles between layers here. This design proved to be especially advantageous in previous experiments for bringing about anisotropic properties, and adjustment of the preset conditions, for example, by selecting the angles of the layers, is possible.

A membrane tank system can be defined as non-self-supporting tanks, which have walls consisting of a thin layer. The flexible walls may be supported via an insulating layer by surrounding structures of the ship. In addition, membrane tanks are usually designed exclusively for low overpressures of less than 0.7 bar or even less than 0.25 bar relative to an ambient pressure, as a result of which they can be manufactured in a substantially more material-saving manner than can pressurized gas containers.

In an advantageous embodiment, the angles of the layers arranged in relation to one another with reference to a defined primary direction may have the values 0°, 33° and −33° or the values 0°, 45° and −45°. The layered structure shows especially favorable properties for these values.

By using fibers with very low or negative coefficients of thermal expansion, such as carbon, polyethylene, PBO, aramid or glass fibers, it is possible to adjust the coefficient of thermal expansion of the barrier layer arrangement in the primary direction to a very low to negative value. Furthermore, it is possible, owing to the layered structure, to adjust the stiffness of the barrier layer arrangement in the secondary direction to a low value. As a result, hindered temperature-related shrinkages lead to low stresses.

The plurality of layers for designing an anisotropic composite may be formed exclusively from one type of fiber, for example, exclusively from carbon fibers or exclusively from glass fibers. In a hybrid design, at least two layers may be formed from different fiber materials. For example, one layer for designing an anisotropic fiber composite may be formed from carbon fibers and at least one layer from glass fibers. Since carbon fibers have a negative coefficient of thermal expansion, favorable properties are obtained for an anisotropic fiber composite especially when combined with layers from glass fibers.

The plurality of layers are advantageously arranged symmetrically with the central plane of the composite layer. The development of internal stresses is prevented hereby.

The layers may be designed as prepregs, consisting of endless fibers, which may also be in the form of a fabric, in a yet uncured plastic matrix, the matrix being manufactured from epoxy resin, polyester resin, polyurethane or another suitable material. Prepregs lead to a uniform and high quality, and low undulation (fiber deflection) and a high percentage of fibers is also advantageous. In addition, prepregs are well suited for machining and automated manufacturing processes.

The material parameters coefficient of thermal expansion and modulus of elasticity can be specifically adjusted by selecting the reinforcing material, filler, material for the matrix and layered structure. The coefficient of thermal expansion can be adjusted to a low value in the primary direction and the modulus of elasticity can be adjusted to a low value by the layered structure in a secondary direction, which is arranged at an angle of 90° relative to the primary direction. In particular, the coefficient of thermal expansion and the modulus of elasticity are relevant for the stresses and expansions occurring in a barrier at very low temperatures and can be adjusted specifically in a direction-dependent manner in a fiber-reinforced plastic.

Due to these properties, the barrier layer arrangement shrinks nearly exclusively in the secondary direction, which makes it possible to reduce the number of expansion compensators, and it may also become possible to use expansion compensators exclusively in one direction.

The barrier layer arrangement may be designed such that the at least one layer, which is made of a material having anisotropic properties, is gas-tight, especially such that the material having anisotropic properties is itself gas-tight.

Gas-tightness of the barrier layer arrangement may also be established by the anisotropic composite layer being connected to a gas-tight layer or to a liner, wherein the liner is manufactured, for example, from aluminum or polyethylene. Gas-tightness of the anisotropic composite layer itself is not absolutely necessary in this case.

In one embodiment, the at least one layer has beads in one direction only, for example, in the secondary direction, and the beads may be formed especially predominantly or exclusively for compensation of thermal expansions in one direction.

Even though beads are arranged in both directions in other embodiments, the total number of beads is smaller in a first direction and especially only half the total number of beads present in a second direction orthogonal to the first direction.

The beads may be designed, for example, as straight beads, but other shapes may be advantageous as well.

The anisotropic composite layer has a ratio of the coefficient of thermal expansion in the secondary direction to that in the primary direction of greater than 2 and, in the case of negative coefficients of thermal expansion, a value lower than −9, said ratio being dependent on the angles of the layers and the material of the fibers and of the matrix, as well as a ratio of the modulus of elasticity in the primary direction to that in the secondary direction of between 1.5 and 15.

The ratio of the coefficient of thermal expansion in the secondary direction to that in the primary direction may be greater than 3 or greater than 5 in alternative embodiments. In addition, the ratio of the modulus of elasticity in the primary direction to that in the secondary direction may be especially greater than 2 or 3.

The barrier according to the present invention, comprising at least one anisotropic composite layer, makes it possible, thanks to the low coefficient of thermal expansion, to reduce the number of compensators in the primary direction or to eliminate the need for compensators in the primary direction, which results in a marked simplification of the system.

The anisotropic composite layer can be manufactured in an automated, continuously operating manufacturing process with high quality in a time- and cost-saving manner.

The material having anisotropic properties is designed in some embodiments as a compact material, i.e., without inclusions of gases and/or liquids. Especially thin membranes can be prepared due to such a design. In addition, the anisotropic properties of compact materials can be better adjusted than those of foamed materials, because additional manufacturing irregularities occur in foamed materials due to the fact that the size of the cavities contained in the foamed material is variable at least to a certain extent.

In further embodiments, the anisotropic material contains additional materials or fillers and additives for modifying properties. For example, flame-retardant additives or pigments may be added.

In another embodiment, the value of the coefficient of thermal expansion of the anisotropic material is lower than 10−5/K, advantageously lower than 8×10−6/K and especially advantageously lower than 4×10−6/K in a direction in which the value of the coefficient of thermal expansion is minimal.

By minimizing or eliminating the compensator cross-related coupling of two directions of the system, it is possible to adapt the tank system to the site of use in a more variable manner.

The simplified construction is suitable for general use in ultra cold facilities such as transport and storage containers, e.g., tank containers, liquefied gas tanks onboard ships and offshore facilities as well as for land tanks. The containers may have various shapes, e.g., prismatic, cylindrical or spherical shapes or be composed of a plurality of shapes.

In addition to the barrier layer arrangement, the present invention also pertains to a membrane tank system for receiving ultra cold liquids, with an insulating layer and with a barrier layer arrangement of the type described.

In one embodiment each, the membrane tank system has a volume of at least 1,000 m3, 10,000 m3 or 50,000 m3.

In another embodiment, the membrane tank system can be loaded to a maximum of 0.7 bar or even only up to 0.25 bar overpressure and is not therefore designed for storing pressurized gas.

An exemplary embodiment of the present invention is shown in drawings and will be explained in more detail below.

DESCRIPTION OF THE PREFERRED EMBODIMENTS

Figure 1:
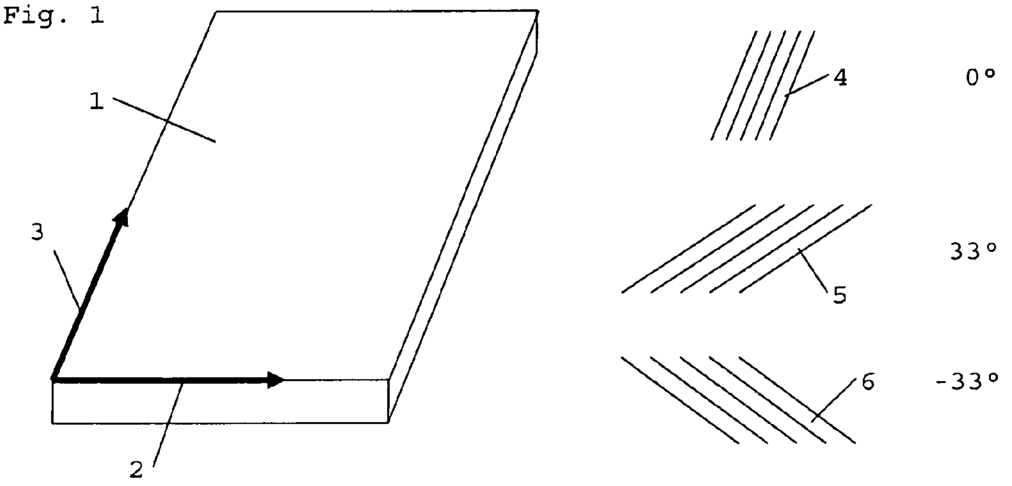
FIG. 1 is a schematic view showing a barrier layer (left) with a definition or primary and secondary direction and a schematic view of layers of a fiber material arranged at an angle of 0°, 33° and −33°.

Referring to the drawings in particular, FIG. 1 schematically shows a barrier layer 1, which is designed as an anisotropic composite or anisotropic, fiber-reinforced plastic. This means that the composite possesses direction-dependent properties, which are preset by the material parameters, especially the coefficient of thermal expansion $\alpha_{\Delta T}$ and the stiffness, which is indicated by the modulus of elasticity. These two parameters are relevant for the stresses and expansions occurring in the barrier layer at very low temperatures.

The composite of the barrier layer consists of oriented fibers embedded in a matrix. In order for the shrinkage of the barrier layer to occur essentially in one direction only, which is designated as the secondary direction 2 in FIG. 1, the coefficient of thermal expansion $\alpha_{\Delta T}$ must be as high as possible, on the one hand, in a primary direction 3 extending at right angles to the secondary direction 2, and the stiffness in the secondary direction 2 should also have a low value.

The thermal expansion of the barrier layer 1 is affected, among other things, by the selection of the fibers and the stiffness [and] by the design of the barrier layer.

The oriented fibers of the barrier layer 1 or of the composite are arranged in different layers over the thickness of the layer, the layers forming different angles with one another. Three layers 4, 5 and 6, which are arranged one on top of another and form an angle of 0°, 33° and −33°, respectively, with one another, are shown as an example on the right-hand side of FIG. 1.

Carbon, polyethylene, aramid, PBO or glass fibers or another suitable material is used for the reinforcing material, while the matrix is manufactured, for example, from epoxy resin, polyester resin, polyurethane or another suitable material.

The fibers or fiber layers 4, 5 and 6 may be formed exclusively from one fiber material, e.g., carbon fibers or glass fibers. The fiber material may also be mixed in hybrid embodiments, e.g., carbon fibers are used for a first layer and glass fibers for other layers.

The anisotropic composite layer is gas-tight due to the materials selected. It may be combined with other additional layers, e.g., connected to a gas-tight layer or a liner. To manufacture the fiber composite and barrier layer 1, the fiber layers may be placed one over the other at preset angles and impregnated with the matrix and cured.

Furthermore, the layers may also be designed as prepregs, in which endless fibers, which may also be in the form of a fabric, are embedded in a still) uncured plastic matrix, the prepregs being placed one over another at an angle and connected to one another by supplying heat and applying pressure.

Figure 2:
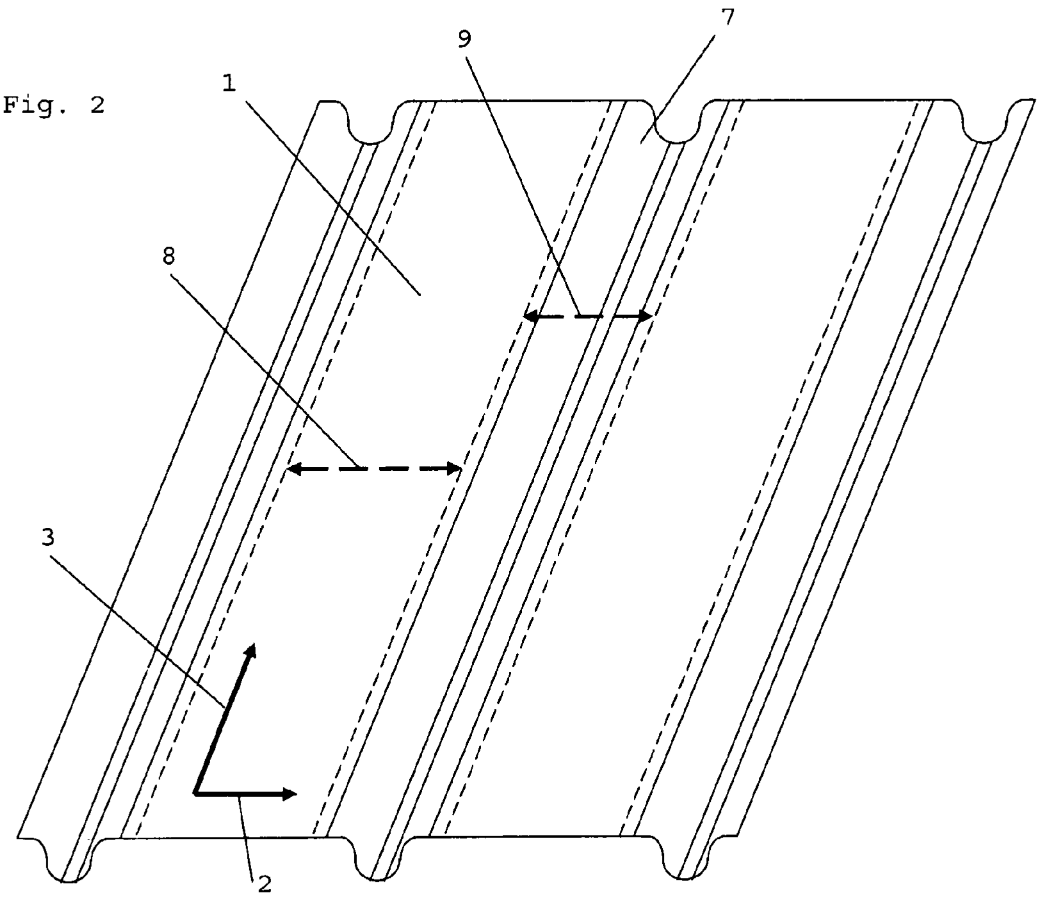
FIG. 2 is a perspective view showing an exemplary embodiment of a barrier layer arrangement according to the present invention with composite arrangement and compensation beads.

FIG. 2 shows an exemplary embodiment of the barrier layer 1, which has a design that is described in connection with FIG. 1, with a plurality of beads, which are oriented in the primary direction 3, being located next to each other as compensators 7 in the secondary direction 2.

If the barrier layer 1 is cooled as a wall of a tank for ultra cold liquids by filling said tank to a temperature in the range of −160° C. or lower, the anisotropic fiber composite brings about a temperature-dependent shrinkage 8, which takes place in the secondary direction 2 only and is indicated by the broken line in FIG. 2, due to a high modulus of elasticity and a very low coefficient of thermal expansion in the primary direction 3 and a simultaneously low modulus of elasticity and high coefficient of thermal expansion in the secondary direction 2 arranged at an angle of 90° in relation to the primary direction 3.

The shrinkage 8 occurring in the secondary direction 2 only is compensated by an expansion 9 of the compensating beads 7, and the barrier layer 6 has no stress peaks caused by intersecting beads in an isotropic fiber composite.

Various examples of the state of the art and of the present invention will be described below, which are listed in Table 1. UD designates unidirectional hybrid: carbon and glass fibers, C: carbon fibers, G: glass fibers, and CLT: classical laminate theory. The index s indicated for the angles in square brackets indicates that the laminates have a mirror-symmetrical design to avoid warpage. [0/45/−45/90]s correspondingly stands for [0/45/−45/90/90/−45/45/0], i.e., right layers.

| Material | | | Coefficient of thermal expansion [$10^{-6}$/K] | | | | Modulus of elasticity [MPa] | |
|---|---|---|---|---|---|---|---|---|
| | | | Determined experimentally | | Calculation according to CLT | | | |
| | Fiber materials | Laminate design | Primary (0°) | Secondary (90°) | Primary (0°) | Secondary (90°) | Primary (0°) | Secondary (90°) |
| Quasi- | Glass | $[0_G, 45_G, -45_G, 90_G]_s$ | 11.00 | 11.00 | 11.79 | 11.79 | 23,711 | 23,711 |
| isotropic | Carbon | $[0_C, 45_C, -45_C, 90_C]$s | 2.58 | 2.58 | 2.66 | 2.66 | 54,335 | 54,335 |
| Anisotropic | Glass | $[0_G, 45_G, -45_G]_s$ | 8.03 | 11.76 | 8.79 | 17.35 | 26,102 | 16,785 |
| | | $[O_G, 33_G, -33_G]_s$ | 6.87 | 16.01 | 7.05 | 25.87 | 31,260 | 14,005 |
| | Hybrid | $[0_C, 45_G, -45_G]_s$ | 2.63 | 13.76 | 2.36 | 19.86 | 57,647 | 16,674 |
| | | $[0_C, 33_G, -33_G]_s$ | 2.54 | 17.96 | 1.89 | 25.14 | 62,776 | 13,556 |
| | Carbon | $[0_C, 45_C, -45_C]_s$ | — | — | 0.09 | 6.74 | 60,476 | 26,015 |
| | | $[0_C, 33_C, -33_C]_s$ | — | — | −1.64 | 15.17 | 76,920 | 14,612 |
| UD | Glass | $[0_G, 0_G 0_G]$ | 6.21 | 17.49 | 7.36 | 31.76 | 44,480 | 13,219 |
| | Carbon | $[0_C, 0_C, 0_C]$ | 0.25 | 25.11 | 0.25 | 31.54 | 139,280 | 9,560 |

UD Unidirectional
Hybrid Carbon and glass fibers
C Carbon fiber
G Glass fiber
CLT Classical Laminate Theory As can be determined from Table 1, the values of 11.79×$10^{-6}$/K are obtained for the coefficient of thermal expansion $\alpha_{\Delta T}$ and 23,711 MPa for the modulus of elasticity (modulus E) according to the classical laminate theory (CLT) for a quasi-isotropic design comprising eight layers, which are arranged one on top of another at the angles [0°, 45°, −45°, 90°]s with the use of glass fibers. The use of carbon fibers leads to the values of 2.66×$10^{-6}$/K for $\alpha_{\Delta T}$ and 54,335 MPa for the modulus of elasticity according to the CLT.

The values of 7.36×$10^{-6}$/K are obtained according to the CLT theory for $\alpha_{\Delta T}$ and 44,480 MPa for the modulus of elasticity in the primary direction 3 and the values of 31.76×$10^{-6}$/K are obtained for $\alpha_{\Delta T}$ and 13,219 MPa for the modulus of elasticity in the secondary direction 2 for a unidirectional design, in which three layers are arranged one on top of another exclusively in the primary direction 3 in the case of glass fibers. In this arrangement, the values of 0.25×$10^{-6}$/K are obtained for $\alpha_{\Delta T}$ and 139,280 MPa for the modulus of elasticity in the primary direction 3 and the values of 31.54×$10^{-6}$/K and 9,560 MPa for the modulus of elasticity in the secondary direction 2 for carbon fibers.

An anisotropic design with six layers arranged one on top of another at the angles [0°, 45°, −45°]s has, according to the CLT, the values of 8.79×$10^{-6}$/K for $\alpha_{\Delta T}$ and 26,102 for the modulus of elasticity in the primary direction 3 and 17.35×$10^{-6}$/K for $\alpha_{\Delta T}$ and 16,785 MPa for the modulus of elasticity in the secondary direction 2 in the case of glass fibers. The values of 0.09×$10^{-6}$/K and 60,467 MPa for the modulus of elasticity are obtained for carbon fibers in this arrangement in the primary direction 3 and the values of 6.74×$10^{-6}$/K for $\alpha_{\Delta T}$ and 26,105 MPa for the modulus of elasticity are obtained in the secondary direction 2.

The values of 7.05×$10^{-6}$/Ka for $\alpha_{\Delta T}$ and 31,260 MPa for the modulus of elasticity are obtained according to the CLT in the primary direction 3 and the values of 25.87×$10^{-6}$/K for $\alpha_{\Delta T}$ and 14,005 MPa for the modulus of elasticity are obtained in the secondary direction 2 for an anisotropic design with six layers arranged one on top of another at the angles [0°, 33°, −33°]s for glass fibers. The values of −1.64×$10^{06}$/K for $\alpha_{\Delta T}$ and 76,920 MPa for the modulus of elasticity are obtained in the primary direction 3 and the values of 15.17×$10^{-6}$/K for $\alpha_{\Delta T}$ and 14,612 MPa for the modulus of elasticity are obtained in the secondary direction 2 for carbon fibers in this arrangement.

The values of 2.36×$10^{-6}$/K for $\alpha_{\Delta T}$ and 57,647 MPa for the modulus of elasticity are obtained according to the CLT in the primary direction 3 and the values of 19.86×$10^{-6}$/K for $\alpha_{\Delta T}$ and 16,674 MPa for the modulus of elasticity are obtained in the secondary direction 2 in the case of an anisotropic hybrid design with six layers arranged one on top of another at the angles [0°, 45°, −45°]s, of which the layer in the primary direction 3) (0°) is made of carbon fibers and the layers extending at the angles 45° and −45° are made of glass fibers. The values of 1.89×$10^{-6}$/K for $\alpha_{\Delta T}$ and 62,776 MPa for the modulus of elasticity are obtained according to the CLT in the primary direction 3 and the values of 25.14×$10^{-6}$/K and 13,556 MPa for the modulus of elasticity are obtained in the secondary direction 2 for an arrangement at the angles of 0°, 33° and −33° in the case of the hybrid design.

The lowest coefficient of thermal expansion in the primary direction is attained with a [33°/−33°]s layer arrangement. An additional 0° layer increases the strength in the primary direction 3.

While a quasi-isotropic layer arrangement has identical values for the modulus of elasticity and the coefficient of thermal expansion in the primary direction 3 and in the secondary direction 2, a value of the quotient of the coefficient of thermal expansion in the secondary direction, divided by the coefficient of thermal expansion in the primary direction, can be adjusted to a value greater than 2 by selecting the materials and angles for the layers. In case of a negative quotient, the value of the quotient is preferably greater than 5 and especially preferably greater than 10.

The value of a quotient of the modulus of elasticity in the primary direction, divided by the modulus of elasticity in the secondary direction, can be set between 1.5 and 15 by selecting the materials and angles for the layers.

The above figures show only details of a barrier layer. A complete barrier layer can be manufactured in nearly any desired shape. For example, the barrier layer may be designed such as to be suitable for spherical, prismatic or cylindrical shapes. Composite shapes are possible as well.

Figure 3:
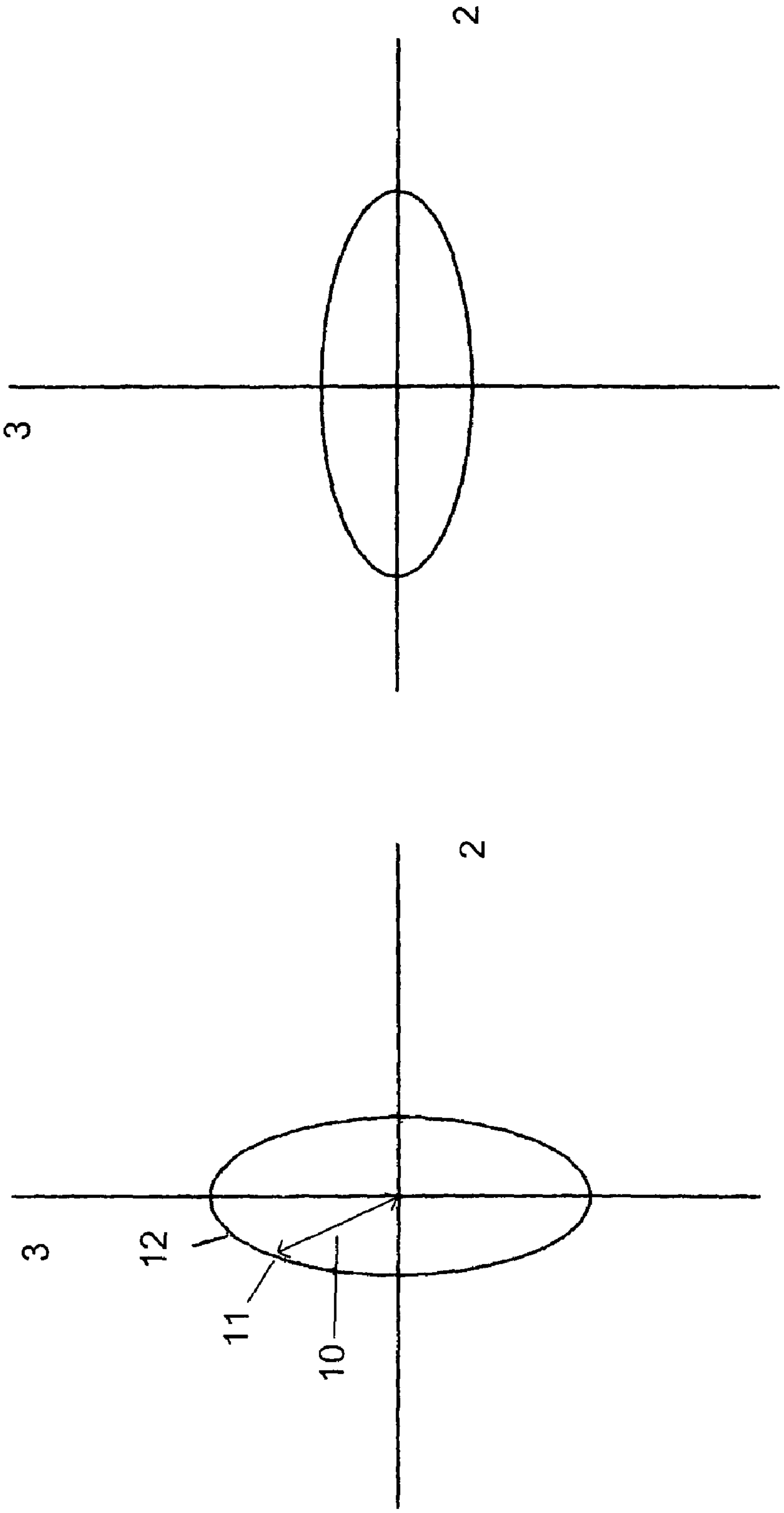
FIG. 3 is a view showing the direction dependence of the modulus of elasticity (left) and of the coefficient of thermal expansion (right).

FIG. 3 shows the modulus of elasticity (left) and the coefficient of thermal expansion (right) as a function of the direction. A distance 10 of a point 11 on the ellipse 12 corresponds to the modulus of elasticity in the corresponding direction. The coefficient of thermal expansion is shown in the same manner in the right-hand part of the figure. As can be recognized, the modulus of elasticity is markedly lower in the secondary direction 2 than in the primary direction 3, and the coefficient of thermal expansion is markedly lower in the primary direction 3 than in the secondary direction 2.

While specific embodiments of the invention have been described in detail to illustrate the application of the principles of the invention, it will be understood that the invention may be embodied otherwise without departing from such principles.

The invention claimed is:

1. A barrier layer arrangement with gas-tight properties for containers for transporting and storing liquefied gases, the barrier layer arrangement comprising:

a layer consisting of a material having anisotropic properties, wherein the anisotropic properties are adjustable with respect to thermal expansion characteristics such that a value of a ratio of a coefficient of thermal expansion in a secondary direction to a coefficient of thermal expansion in a primary direction, that is orthogonal to the secondary direction, equals at least 1.3.

2. A barrier layer arrangement in accordance with claim 1, wherein the anisotropic properties are adjustable with respect to elasticity characteristics such that a value of a ratio of a modulus of elasticity in the primary direction to a modulus of elasticity in the secondary direction is at least 1.3.

3. A barrier layer arrangement in accordance with claim 1, wherein the value of the ratio of the coefficient of thermal expansion in the secondary direction to the coefficient of thermal expansion in the primary direction is at least 4.

4. A barrier layer arrangement in accordance with claim 1 through 3, wherein the material is a composite, and said composite comprises a fiber composite.

5. A barrier layer arrangement in accordance with claim 1, wherein:

the material is a composite; and the anisotropic properties of the composite is adjustable by selecting a fiber material and/or material for a matrix embedding the fibers and/or a filler and/or by design features of the composite.

6. A barrier layer arrangement in accordance with claim 4, wherein the anisotropic properties of the material of the layer, which said material comprises a composite, can be adjusted by a design of a plurality of layers of a fiber material with oriented fibers, which said layers are arranged at certain angles in relation to one another.

7. A barrier layer arrangement in accordance with claim 6, wherein the angles of the layers arranged in relation to one another relative to the defined primary direction have the values of 0°, 33° and −33° or the values of 0°, 45° and −45°.

8. A barrier layer arrangement in accordance with claim 4, wherein the composite comprises fibers that are at least one of carbon, aramid, polyethylene, PBO or glass fibers.

9. A barrier layer arrangement in accordance with claim 6, wherein the plurality of layers for designing an anisotropic composite are formed exclusively of one type of fiber, or as a hybrid material from a plurality of types of fibers.

10. A barrier layer arrangement in accordance with claim 6, wherein the plurality of layers are arranged symmetrically with the central plane of the layer designed as a composite.

11. A barrier layer arrangement in accordance with claim 4, wherein the material for the matrix embedding the fibers or layers is preferably epoxy resin, polyester resin or polyurethane.

12. A barrier layer arrangement in accordance with claim 1, wherein the anisotropic layer is connected to at least one gas-tight layer or at least one liner.

13. A barrier layer arrangement in accordance with claim 1, wherein the anisotropic layer has compensators, such as beads, for compensation of physical stresses in one direction only.

14. A barrier layer arrangement in accordance with claim 1, wherein the material possessing anisotropic properties is designed as a compact material.

15. A barrier layer arrangement in accordance with claim 1, wherein the value of the coefficient of thermal expansion of the anisotropic material in a direction in which the value of the coefficient of thermal expansion is minimal is lower than $10^{-5}$/K.

16. A membrane tank for receiving ultra cold liquids, the membrane tank comprising:

an insulating layer; and a barrier layer arrangement with gas-tight properties, the barrier layer arrangement comprising:

a layer formed of a material having anisotropic properties, the layer having a primary direction and a secondary direction that is orthogonal to the primary direction, the anisotropic properties comprising thermal expansion characteristics wherein a ratio of a coefficient of thermal expansion in the secondary direction to a coefficient of thermal expansion in the primary direction, equals at least 1.3.

17. A membrane tank in accordance with claim 16, wherein the anisotropic properties are adjustable with respect to elasticity characteristics such that a value of a ratio of a modulus of elasticity in the primary direction to a modulus of elasticity in the secondary direction is at least 2.

18. A membrane tank in accordance with claim 16, wherein the value of the ratio of the coefficient of thermal expansion in the secondary direction to the coefficient of thermal expansion in the primary direction is at least 20.

19. A membrane tank in accordance with claim 16, wherein the material is a composite.

20. A membrane tank in accordance with claim 19 wherein:

the anisotropic properties of the composite is set by selecting one or more of:

a fiber material comprising fibers formed of at least one of carbon, aramid, polyethylene, PBO or glass fibers;

material for a matrix embedding the fibers in the composite;

a filler associated with or in the composite; and a pattern or orientation of plurality of layers of a fiber material.

* * * * *